(12) United States Patent
Schaefer et al.

(10) Patent No.: US 8,552,345 B2
(45) Date of Patent: Oct. 8, 2013

(54) METHOD FOR OPERATING A DIESEL FUEL FILTER HEATER

(75) Inventors: Peter Schaefer, Bretten (DE); Clement Rinkert, Bretten (DE)

(73) Assignee: BorgWarner BERU Systems GmbH, Ludwigsburg (DE)

( * ) Notice: Subject to any disclaimer, the term of this patent is extended or adjusted under 35 U.S.C. 154(b) by 212 days.

(21) Appl. No.: 13/110,389

(22) Filed: May 18, 2011

(65) Prior Publication Data

US 2011/0284521 A1   Nov. 24, 2011

(30) Foreign Application Priority Data

May 20, 2010 (DE) .......................... 10 2010 022 242

(51) Int. Cl.
   G05B 1/02 (2006.01)
(52) U.S. Cl.
   USPC ....... 219/494; 219/505; 219/492; 123/179.13
(58) Field of Classification Search
   CPC ...................................................... H05B 1/02
   USPC ................ 219/494, 497, 499, 504, 505, 492;
   123/179.1, 179.6, 179.7, 179.13, 179.18
   See application file for complete search history.

(56) References Cited

U.S. PATENT DOCUMENTS

| 4,479,477 A | * | 10/1984 | Manchester | ................... 123/557 |
| 4,606,306 A | * | 8/1986 | Caron et al. | ............. 123/179.21 |
| 4,861,966 A | * | 8/1989 | Matthiesen et al. | .......... 219/205 |
| 6,878,903 B2 | * | 4/2005 | Duba | ............................ 219/270 |

FOREIGN PATENT DOCUMENTS

| DE | 299 11 711 U1 | 11/1999 |
| DE | 101 52 084 A1 | 4/2003 |
| EP | 0 162 939 A1 | 5/1984 |

OTHER PUBLICATIONS

Houben H., et al.: The New Electronically Controlled Glow System ISS for Diesel Engines, MTZ 61 (2000) 10, p. 668-674.

* cited by examiner

*Primary Examiner* — Mark Paschall

(57) ABSTRACT

The invention relates to a method for operating a diesel fuel filter heater comprising at least one PTC element, in a motor vehicle. According to the invention, a glow plug control device is used to generate an effective voltage from a vehicle system voltage using pulse width modulation, which is then applied at the filter heater.

10 Claims, 1 Drawing Sheet

METHOD FOR OPERATING A DIESEL FUEL FILTER HEATER

The invention relates to a method for operating a diesel fuel filter heater having at least one PTC element, in a motor vehicle.

At low temperatures, diesel fuel becomes increasing viscous and incapable of flowing through a fuel filter to an adequate extent. This is referred to as the paraffination of the fuel filter. When frost forms, a tank heater is not always sufficient for ensuring that the temperature of the diesel fuel is high enough in the entire line system to prevent paraffination of the fuel filter. This situation is ameliorated by a filter heater.

The demand for diesel fuel filter heaters has increased due to the increasing use of diesel fuel mixtures that contain a mineral portion and a biosynthetic portion. Such diesel fuel mixtures are often referred to as biodiesel and are sold at filling stations in different mixing ratios. In general, the viscosity of the fuel mixture is that much higher at a given temperature, the higher the portion is of biosynthetic fuel. When biodiesel is used, the risk is therefore greater that the fuel filter will become paraffinated.

The problem addressed by the present invention is that of demonstrating a way to implement the heating of a diesel fuel filter in a low-cost manner.

SUMMARY OF THE INVENTION

In a method according to the invention, a control device is used to generate an effective voltage from a vehicle system voltage using pulse width modulation, which is then applied at the filter heater. The control device can be a glow plug control device, for instance, which is present anyway in diesel vehicles, thereby making it possible to implement control of a diesel fuel heater in a low-cost manner.

According to the invention, the requirement for continued heating of the fuel filter is determined on the basis of the power consumption of the filter heater. Surprisingly, the evaluation of the power consumed by the heater can be utilized to determine whether the fuel filter has become paraffinated. The present invention makes use of the physical effect that the filter heater is cooled by fuel flowing therethrough. More power is therefore required to heat a fuel filter having good throughflow than to heat up a paraffinated fuel filter having viscous or waxy diesel fuel adjacent thereto.

The requirement for continued heating of the fuel filter exists when the viscosity of the fuel is high and therefore fuel cannot flow through the fuel filter, or can only do so slowly. If the viscosity of the diesel fuel is low, it can easily flow through the diesel fuel filter, and therefore heating is not required. The throughflow state and, therefore, indirectly the viscosity of the diesel fuel can thus be deduced from the power consumption of the filter heater. The evaluation of the power consumption of the filter heater can therefore be utilized to easily determine the heating requirement. This evaluation can be carried out easily by a control device. A glow plug control device, in particular, can easily perform this evaluation, since it is designed to monitor and evaluate the power consumption of glow plugs, i.e. electric heaters.

Although conventional fuel filter heaters are heated, as a precautionary measure, to higher temperatures than would be required for fuels containing little or no biosynthetic portions, a method according to the invention can be used to largely prevent unnecessary heating of the fuel filter. The vehicle power supply system is therefore stressed to a lesser extent by a method according to the invention. The same can be achieved using conventional control methods only by employing two pressure sensors to measure the pressure in a fuel line upstream and downstream of the fuel filter, respectively, and, if the pressure differential is high, it is concluded that the fuel filter has been paraffinated.

The requirement for continued heating of the fuel filter can be determined by evaluating the power consumed while heating up or during continuous operation, i.e. given a constant heating resistance.

By evaluating the power consumed by the filter heater while heating up, it can be easily determined, e.g. every time the vehicle is started, whether there is a need to heat the fuel filter, i.e. whether the fuel filter is paraffinated. This is an important advantage, since a simple temperature measurement does not suffice in this case, due to different diesel fuel mixtures. Relieving the power supply system by preventing unnecessary or unnecessarily intensive heating of the fuel filter is welcomed in the start phase of a motor vehicle in particular, in which the power supply system is regularly heavily loaded.

In another advantageous refinement of the invention, the electrical resistance of the heater is regulated to a setpoint value. In this manner the heater can be operated at an optimal working point. Preferably a value located between a minimum and an inflection point of the resistance temperature characteristic curve of the PTC element is selected as the setpoint value of the electrical resistance. A ceramic heating resistor is preferably used as the PTC element.

According to another advantageous refinement, in order to check the functionality of the heated diesel fuel filter, the power consumed by the filter heater after a heating-up phase is monitored and compared to a specified threshold value. If the power is less than the threshold value while a pump used to pump diesel fuel from a tank to the diesel fuel filter is switched on, a warning signal is generated. The reason is that low power consumption by the filter heater while the fuel pump is switched on indicates that there is poor flow or no flow through the fuel filter. In addition to inadequate heating of the diesel fuel, high flow resistance can be due, in particular, to the filter being loaded with foreign objects, i.e. clogged. After a heating-up phase, the fuel filter has such a high temperature that the only cause of an excessive flow resistance per se is clogging of the filter.

By evaluating the power consumption after a heating-up phase, it is therefore advantageously possible to determine whether the filter has already been greatly loaded with foreign objects, and that imminent failure due to clogging must be expected. A method according to the invention can therefore advantageously warn the owner of a vehicle that filter failure is imminent. Replacing the filter in time can prevent damage.

Preferably, the threshold value is defined depending on ambient conditions of the fuel filter heating, e.g. depending on the ambient temperature or coolant temperature. Such data can be reported to the control device of the engine control unit in the vehicle, or the engine control unit itself can be used as the control device for a method according to the invention.

In an advantageous refinement of the invention, the control device turns off the filter heater, i.e. the effective voltage applied to the filter heater is set to zero when the power consumption exceeds a specified limit value. As mentioned above, high power consumption means that diesel fuel is flowing well through the fuel filter. In such a case, continued heating is not required. Preferably, the control device turns the filter heater back on after a specified period of time, and evaluates the power consumption to check whether there is a need for continued heating. By turning off the filter heater, the temperature of the fuel filter and, therefore, the temperature of the diesel fuel can decrease, and so the viscosity of the diesel fuel increases again, under certain circumstances, to the extent that heating is required once more. This can be checked easily by turning on the filter heater once more, in particular via the heating up that occurs as a result.

BRIEF DESCRIPTION OF THE DRAWINGS

Further details and advantages of the invention are explained using an embodiment, with reference to the attached drawings. In the drawings.

DETAILED DESCRIPTION

Figure 1:
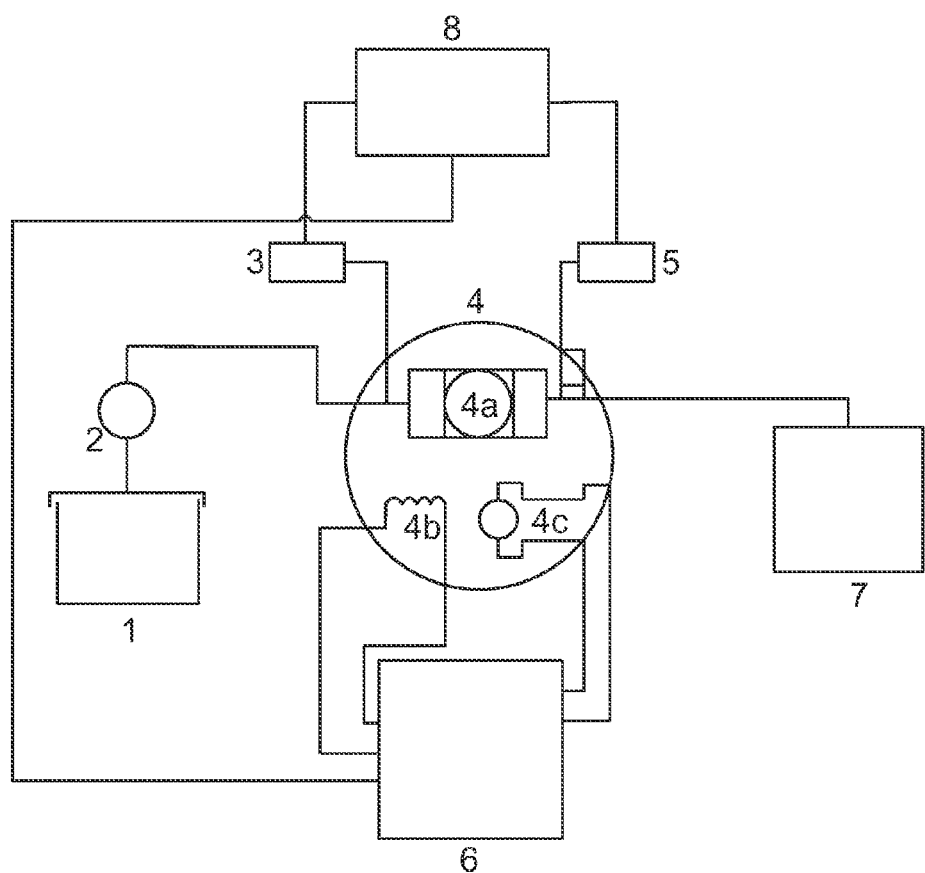
FIG. 1 shows a schematic depiction of the fuel supply system of a vehicle, and the control of a fuel filter heater.

FIG. 1 shows a schematic depiction of fuel tank 1 of a vehicle. Using a fuel pump 2, diesel fuel is pumped from fuel tank 1 to a fuel filter 4 and, from there, to fuel injection system 7 (common rail) of a motor vehicle. Fuel filter 4 contains a water trap 4a, a heater 4b, and a water sensor 4c. Filter heater 4b, which is depicted symbolically by a coil, comprises at least one PTC element, preferably a ceramic PTC element, and is controlled by a glow plug control device 6. Glow plug control device 6 communicates with an engine control unit 8.

Engine control unit 8 notifies glow plug control device 6 when heating may be required, e.g. before an engine is started. Glow plug control device 6 then generates an effective voltage from a vehicle system voltage, using pulse width modulation, and applies it to filter heater 4b. Glow plug control device 6 then monitors the power consumed by filter heater 4b during a plurality of consecutive voltage pulses, and can determine on the basis thereof whether the viscosity of the diesel fuel actually makes heating necessary, or whether continued heating is required. For this purpose, the power consumption is compared to a limit value. If the power consumption exceeds the limit value, it is determined that fuel flows well through fuel filter 4a, and filter heater 4b is switched off by glow plug control device 6 setting the applied effective voltage to zero.

Preferably, the limit value is determined as a function of the current resistance value of filter heater 4b, e.g. using a characteristic curve stored in glow plug control device 6 for this purpose. Since the limit value is determined as a function of the current resistance value of filter heater 4b, detection of the flow-related cooling of filter heater 4b is improved.

A pressure sensor 3 which measures the pressure in a fuel line upstream of fuel filter 4 can be connected to engine control unit 8. In addition, a second pressure sensor 5 can be provided in order to measure the pressure in a fuel line downstream of the fuel filter. By evaluating the pressure signals, engine control unit 8 can determine additional information about the need for heating of fuel filter 4b and communicate same to glow plug control device 6. Pressure sensors 3, 5 are not absolutely necessary, however. In a simplified system, one or even both pressure sensors can be omitted, in particular in a retrofitted filter heater, i.e. a filter heater installed at a later point in time.

Figure 2:
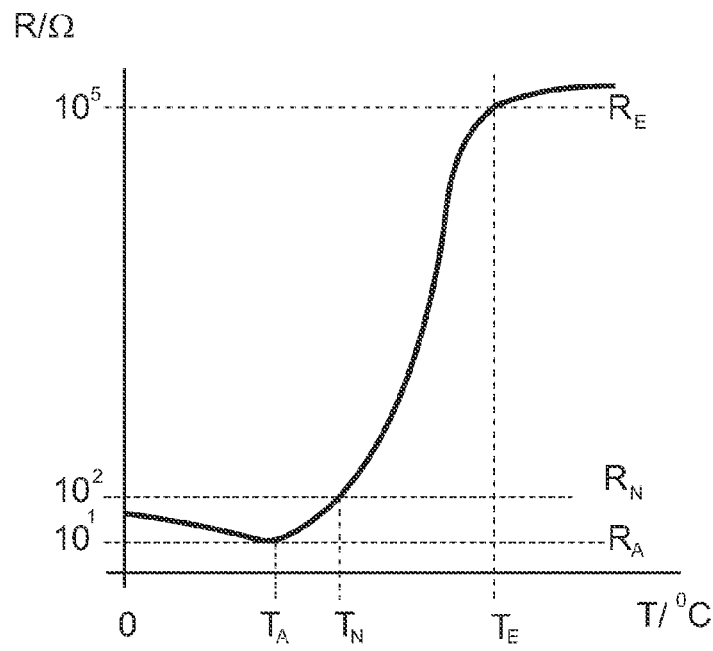
FIG. 2 shows a schematic example of the course of resistance of a ceramic PTC resistor.

Glow plug control device 6 regulates the electrical resistance of filter heater 4b to a setpoint value. FIG. 2 schematically depicts the course of resistance of a typical ceramic PTC resistor of the type that can be used for filter heater 4b. The shape of the resistance temperature characteristic curve has a minimum at a temperature $T_A$ and increases abruptly in a subsequent temperature interval. At a temperature $T_E$, the abrupt increase is followed by a relatively flat course of electrical resistance. Preferably a value located between minimum $T_A$ and an inflection point of the resistance temperature characteristic curve of the PTC element is selected as the setpoint value of the electrical resistance. A suitable setpoint value is indicated in FIG. 2 at temperature $T_N$. The resistance of the setpoint value should be so great that the electrical resistance of the PTC element at lower temperatures is always less than the setpoint value.

Glow plug control device 6 can check the functionality of heated diesel fuel filter 4a by evaluating the power consumption. For this purpose, the power consumed by filter heater 4b after a heating-up phase is monitored and compared to a specified threshold value. In particular, the average power consumed over time when regulating to the setpoint value of the electrical resistance can be compared to a specified threshold value. If the power consumed when pump 2 is switched on is less than the threshold value, a warning signal is generated. The reason is that, in this case, flow through filter 4a is inadequate despite being heated to an operating temperature at which the diesel fuel flows easily. If the consumption is less than the threshold value, this therefore indicates that the filter is loaded with foreign objects and should be replaced.

The threshold value can be defined depending on ambient conditions and fuel filter heater 4b, e.g. depending on the ambient temperature or coolant temperature. The reliability of the warning signal can be improved in this manner.

REFERENCE NUMERALS

1 Fuel tank
2 Fuel pump
3 Pressure sensor
4 Fuel filter
4a Water trap
4b Heater
4c Water sensor
5 Pressure sensor
6 Glow plug control device
7 Fuel injection system
8 Engine control unit

What is claimed is:

1. A method for operating a diesel fuel filter heater, said heater comprising at least one PTC element, wherein a control device is used to generate an effective voltage from a vehicle system voltage using pulse width modulation, which is applied to the filter heater, said method comprising determining a requirement for continued heating of the fuel filter on the basis of power consumed by the filter heater, wherein the electrical resistance of the heater is regulated to a setpoint value, wherein a value is selected as a setpoint value of the electrical resistance which is located between a minimum and an inflection point of the resistance-temperature characteristic curve of the PTC element.

2. The method according to claim 1, wherein the power consumed during a plurality of consecutive voltage pulses is evaluated to determine the requirement for continued heating.

3. The method according to claim 1, further comprising monitoring the power consumed by the filter heater after a heating-up phase is monitored and compared to a specified threshold value in order to check the functionality of the heated diesel fuel filter and if the power is less than the threshold value while a pump is used to pump diesel fuel from a tank to the diesel fuel filter is switched on, a warning signal is generated.

4. The method according to claim 3, wherein the threshold value is defined depending on the ambient conditions of the fuel filter heater.

5. The method according to claim 3, wherein the threshold value is defined depending on the ambient temperature or the coolant temperature.

6. The method according to claim 1, wherein the control device turns off the filter heater when the power consumption exceeds a specified limit value.

7. The method according to claim 6, wherein the control device turns the filter heater back on after a specified period of time, and evaluates the power consumption to check whether there is a need for continued heating.

8. The method according to claim 1, wherein the control device is a glow plug control device.

9. A method for operating a diesel fuel filter heater, said heater comprising at least one PTC element, wherein a control device is used to generate an effective voltage from a vehicle system voltage using pulse width modulation, which is applied to the filter heater, said method comprising:
- determining a requirement for continued heating of the fuel filter on the basis of power consumed by the filter heater;
- monitoring the power consumed by the filter heater after a heating-up phase is monitored and compared to a specified threshold value in order to check the functionality of the heated diesel fuel filter; and
- generating a warning signal if the power is less than the threshold value while a pump is used to pump diesel fuel from a tank to the diesel fuel filter is switched on.

10. The method according to claim 9, wherein the specified threshold value is defined depending on an ambient temperature or a coolant temperature.

\* \* \* \* \*